(12) United States Patent
Verthein et al.

(10) Patent No.: US 9,065,971 B2
(45) Date of Patent: Jun. 23, 2015

(54) VIDEO AND AUDIO TAGGING FOR ACTIVE SPEAKER DETECTION

(71) Applicant: Microsoft Technology Licensing, LLC, Redmond, WA (US)

(72) Inventors: William George Verthein, Sammamish, WA (US); Simone Leorin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 13/719,314

(22) Filed: Dec. 19, 2012

(65) Prior Publication Data

US 2014/0168352 A1    Jun. 19, 2014

(51) Int. Cl.
*H04N 7/15* (2006.01)
*H04N 7/14* (2006.01)

(52) U.S. Cl.
CPC . *H04N 7/15* (2013.01); *H04N 7/147* (2013.01)

(58) Field of Classification Search
CPC ........... H04N 7/15; G06F 21/32; G06Q 10/10
USPC ............. 348/14.08, 515; 375/240.01, 240.16; 386/241; 704/233, 251, 8, 273; 725/35, 725/18, 34, 136; 340/12.51, 539.11; 370/493; 379/142.17, 168; 382/165; 463/35, 42
See application file for complete search history.

(56) References Cited

U.S. PATENT DOCUMENTS

| | | | | |
|---|---|---|---|---|
| 5,283,639 | A * | 2/1994 | Esch et al. | 725/32 |
| 6,594,629 | B1 * | 7/2003 | Basu et al. | 704/251 |
| 6,749,512 | B2 * | 6/2004 | MacGregor et al. | 463/42 |
| 6,757,300 | B1 * | 6/2004 | Pages et al. | 370/493 |
| 7,081,915 | B1 | 7/2006 | Hamilton | |
| 7,304,585 | B2 * | 12/2007 | Suomela et al. | 340/12.51 |
| 7,450,752 | B2 * | 11/2008 | Zhang | 382/165 |
| 7,561,177 | B2 * | 7/2009 | Cheatle et al. | 348/14.08 |
| 7,563,168 | B2 * | 7/2009 | Jahnke | 463/35 |
| 7,684,982 | B2 * | 3/2010 | Taneda | 704/233 |
| 7,688,889 | B2 * | 3/2010 | Krause | 375/240.01 |

(Continued)

FOREIGN PATENT DOCUMENTS

EP    0898424    2/1999

OTHER PUBLICATIONS

International Search Report & Written Opinion dated Jun. 17, 2014 in PCT Application No. PCT/US2013/076671; 10 Pages.

(Continued)

*Primary Examiner* — Gerald Gauthier
(74) *Attorney, Agent, or Firm* — Andrew Smith; Jim Ross; Micky Minhas

(57) ABSTRACT

A videoconferencing system is described that is configured to select an active speaker while avoiding erroneously selecting a microphone or camera that is picking up audio or video from a connected remote signal. A determination is made whether an audio signal is above a threshold level. If so, then a determination is made as to whether a tag is present in that audio signal. If so, that signal is ignored. If not, a camera is directed toward the sound source identified by the audio signal. A determination is made whether a tag is present in the video signal from that camera. If so, the camera is redirected. If not, local tag(s) are inserted into the audio signal and/or the video signal. The tagged signal(s) are transmitted. Thus, system will ignore sound or video that has an embedded tag from another videoconferencing system.

17 Claims, 5 Drawing Sheets

(56) References Cited

U.S. PATENT DOCUMENTS

| | | | |
|---|---|---|---|
| 8,087,044 B2 * | 12/2011 | Krause et al. | 725/35 |
| 8,135,066 B2 * | 3/2012 | Harrison et al. | 375/240.16 |
| 8,179,476 B2 * | 5/2012 | Plaunt | 348/515 |
| 8,219,384 B2 * | 7/2012 | Lloyd et al. | 704/8 |
| 8,635,066 B2 * | 1/2014 | Morrison | 704/251 |
| 8,713,593 B2 * | 4/2014 | Humphrey et al. | 725/18 |
| 2005/0091062 A1 * | 4/2005 | Burges et al. | 704/273 |
| 2005/0138674 A1 * | 6/2005 | Howard et al. | 725/136 |
| 2006/0147063 A1 | 7/2006 | Chen | |
| 2007/0071206 A1 * | 3/2007 | Gainsboro et al. | 379/168 |
| 2007/0247550 A1 * | 10/2007 | Plaunt | 348/515 |
| 2008/0136623 A1 * | 6/2008 | Calvarese | 340/539.11 |
| 2009/0002480 A1 | 1/2009 | Cutler | |
| 2009/0210789 A1 | 8/2009 | Thakkar et al. | |
| 2010/0149303 A1 * | 6/2010 | Thorne et al. | 348/14.08 |
| 2011/0214143 A1 * | 9/2011 | Rits et al. | 725/34 |
| 2012/0127259 A1 | 5/2012 | Mackie et al. | |
| 2012/0321062 A1 * | 12/2012 | Fitzsimmons et al. | 379/142.17 |
| 2014/0161416 A1 * | 6/2014 | Chou et al. | 386/241 |
| 2014/0168352 A1 * | 6/2014 | Verthein et al. | 348/14.08 |

OTHER PUBLICATIONS

The Written Opinion mailed Jan. 5, 2015 for PCT application No. PCT/US2013/076671, 7 pages.

* cited by examiner

VIDEO AND AUDIO TAGGING FOR ACTIVE SPEAKER DETECTION

BACKGROUND

Videoconferencing has become widespread and many offices have rooms especially configured for videoconferencing sessions. Such rooms typically contain video conferencing gear, such as one or more moveable cameras and one or more microphones, the microphones typically being placed at locations around a table in the room for participants. Active Speaker Detection (ASD) is frequently used to select a camera, or to move (pan and/or tilt) a camera to show the person in the room who is speaking and/or to select the microphone which will be active. When a remote person is speaking, their image and/or sound come out of an audio-video display, such as a television (TV), monitor, or other type of display, in the room. This may cause the ASD to erroneously select the image on the remote person on the TV who is talking rather than to select the last local person who is or was talking.

Also, in multiple-location videoconferencing sessions, where three or more separate locations are in a single videoconferencing session, then, typically, several panels will be displayed, one panel being larger than the others and showing the person who is speaking, and the other panels showing a picture from a camera at the other locations. When erroneous ASD occurs, as mentioned above, the equipment in the room where a person is speaking will send a signal to the equipment at the other locations advising that the person at its location is speaking and so the main display should be from its camera. When this happens, the larger panel may switch from showing a person who is actually speaking to showing a picture of a TV screen or an empty chair. Thus, a problem with ASD is that if the sound from the remote videoconferencing system is reflected or is so loud that it triggers ASD then the remote sound may be retransmitted back to the remote system and/or cause the local camera to focus on an empty chair or the display screen showing the remote videoconferencing location.

One technique that has been used to eliminate such erroneous ASD selection is to spot the image scan line tracing on the TV to determine that the sound is coming from a TV rather than a local person. High Definition TVs (HDTVs), however, have high (240 Hz or better) progressive scan rates and image resolutions that are the equal of the cameras so image scan line tracing is of limited use when HDTV is involved. Additionally, ASD can often have trouble with sound echoing around a room. A sound reflective surface, such as window or a glass-covered picture, may reflect sound from the TV in a manner that the sound appears to originate from a local person at the table, even if there is not actually a person sitting at that position at the table. Further, if a recording is made of the videoconference, it is dependent upon a human to remember to accurately label the recording with at least, for example, the date of the videoconference. This is often forgotten and done later, sometimes with an erroneous or incomplete label. It is with respect to these considerations and others that the disclosure made herein is presented.

SUMMARY

Technologies are described herein for a videoconferencing system that selects an active speaker while avoiding erroneously selecting a microphone or camera that is picking up audio or video from a connected remote signal. In one implementation, a tag is added to an outgoing audio and/or video signal. If the microphone picks up a sound that contains the tag from the remote system then the sound is ignored and ASD is not implemented. If the sound does not contain the remote tag then the video from the local camera is inspected. If it contains a remote tag then ASD is not implemented. If a remote tag is not present in either signal then ASD is implemented.

According to one embodiment presented herein, a transmitter system for a videoconferencing system has a tag generator to generate at least one of an audio tag or a video tag, a signal combiner to at least one of (i) combine a received audio signal with the audio tag to produce a tagged audio signal or (ii) combine a received video signal with the video tag to produce a tagged video signal, and a transmitter to transmit (i) the tagged audio signal and the received video signal, (ii) the received audio signal and the tagged video signal, or (iii) the tagged audio signal and the tagged video signal. A remote videoconferencing system can then use the embedded tags to distinguish local sounds and pictures from remote sounds and pictures.

A method for operating a transmitter of a videoconferencing system includes receiving an audio signal, receiving a video signal, generating at least one of an audio tag or a video tag, at least one of (i) combining the audio signal with the audio tag to produce a tagged audio signal or (ii) combining the video signal with the video tag to produce a tagged video signal, and transmitting (i) the tagged audio signal and the video signal, (ii) the audio signal and the tagged video signal, or (iii) the tagged audio signal and the tagged video signal.

A computer storage medium has computer executable instructions stored thereon. Those instructions cause the computer to generate at least one of an audio tag or a video tag, at least one of (i) to combine a received audio signal with the audio tag to produce a tagged audio signal or (ii) to combine a received video signal with the video tag to produce a tagged video signal, and to transmit (i) the tagged audio signal and the received video signal, (ii) the received audio signal and the tagged video signal, or (iii) the tagged audio signal and the tagged video signal.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 5 is a computer architecture diagram showing an illustrative computer hardware and software architecture for a

DETAILED DESCRIPTION

Figure 1:
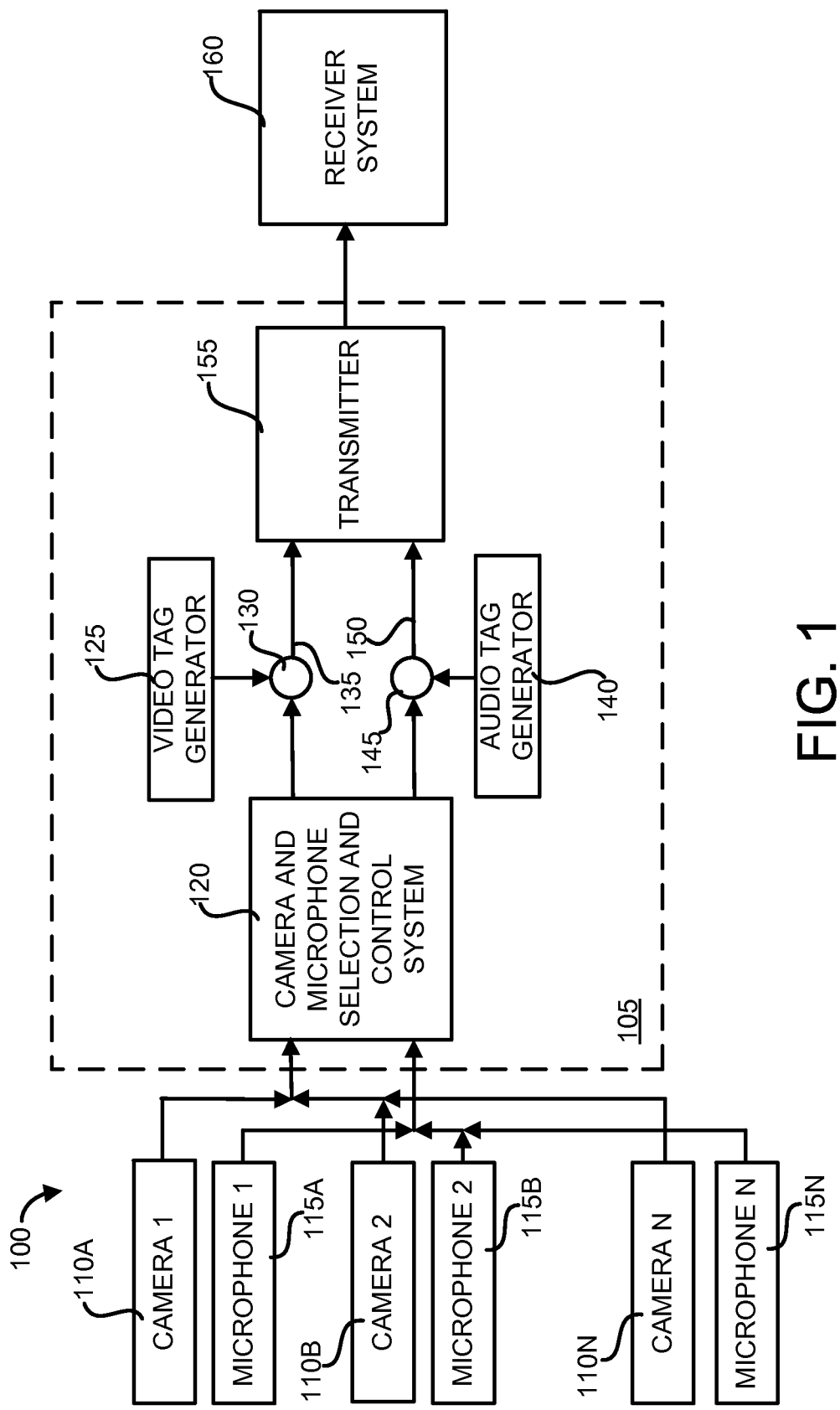
FIG. 1 is an exemplary configuration of a transmitter system of a videoconferencing system.

The following detailed description is directed to technologies for videoconferencing that may correctly select an active speaker while avoiding erroneously selecting a microphone or camera that is picking up audio or video from a connected remote signal. In the following detailed description, references are made to the accompanying drawings that form a part hereof, and which are shown by way of illustration specific embodiments or examples. Referring now to the drawings, in which like numerals represent like elements throughout the several figures, aspects of a computing system and methodology for videoconferencing will be described.

FIG. 1 is an exemplary configuration of a transmitter system 105 of a videoconferencing system 100. The transmitter system 105 has a camera and microphone selection and control system 120, a video tag generator 125, a video signal combiner 130 which provides a video output signal 135, an audio tag generator 140, and an audio signal combiner 145 which provides an audio output signal 150. The video and audio output signals may be broadcast or transmitted by a transmitter 155. The control system 120 may also send signals, intended for remote systems, advising that it has an active speaker who should be given the larger panel if multiple panels are used to display multiple locations. The transmitter 155 may use any convenient means to send the video and audio output signals and any control signals to one or more receiver systems 160 at remote locations. It will be appreciated that there is a transmitter system 105 and a receiver system 160 at each location, and that the transmitter system 105 and receiver system 160 at a location may be combined into a single device.

One or more cameras 110 (110A-110N) and one or more microphones 115 (115A-115N) provide video signals and audio signals, respectively, to the transmitter system 105 and, more particularly, to the control system 120, which has inputs for receiving these signals. The camera and microphone selection and control system 120 may select which camera 110 and which microphone 115 will be used to generate the local picture and sound, if more than one of either device is used, may control the pan, zoom, and/or tilt of the selected camera 110 if the camera can be so controlled, and may generate control or other signals for transmission to the remote systems.

The video tag generator 125 and an audio tag generator 140 generate video and audio tags, respectively. A video signal combiner 130 manipulates or modifies the video pixels in the video stream to add the video tag and produce a tagged video signal 135. An audio signal combiner 145 manipulates or modifies bits in the audio stream to produce a tagged audio signal 150. This may be considered to be "tagging" a signal or adding a tag to a signal. The tag generators 125 and 140 may be embodied in a single device, the signal combiners 130, 145 may be embodied in a single device, and one to all of these components may be embodied as part of the control system 120.

A video and/or audio stream is preferably modified using ways or only to levels which are subtle and/or undetectable to humans, but which can be detected by algorithmic analysis of the video or audio stream. A distortion level of less than a predetermined level may be imperceptible to a typical human observer. For example, modifying the least significant bit in a data word even if the tag was in every word would generally not be noticeable or objectionable. As another example, placing a video tag during a blanking interval or retrace period in a video frame, or placing a video tag at the corner of the bottom of the display may not be noticeable or objectionable. Even placing the video tag as the most significant bit may not be noticeable or objectionable if only on a single pixel during a frame.

The video and/or audio stream may be modified by, for example, using the least significant bit or bits to convey information other than the initial audio or video signal. Such modification may be done every data word, every other data word, every Nth data word, every N milliseconds, before or after a synchronization word or bit, etc. For example, the last bit(s) of the appropriate data word(s) may always have the same value, e.g., 0, 1, 2, 3, etc., may alternate between values, may progress through values, etc. Other techniques may also be used to identify a data word, or part thereof, as a tag, or as identifying information associated with a tag or a videoconference. As another example, an entire data word may be used for this purpose. For example, if audio is sampled at a rate of 4000 samples/second, then using a limited number of these words to convey tag information would not noticeably degrade the quality of the audio. Video signals provide the opportunity to send even more information without noticeably degrading the quality of the video.

Figure 2:
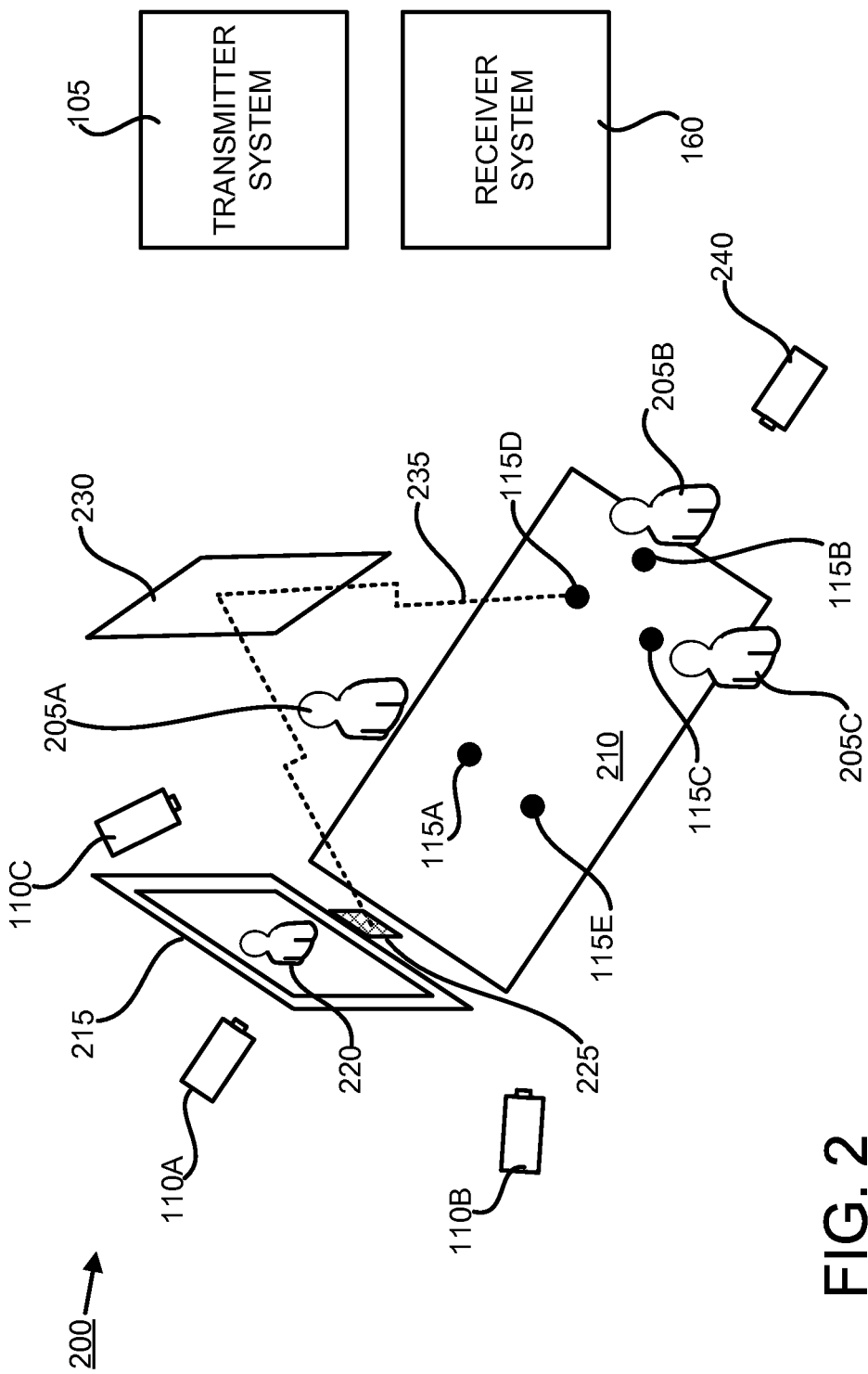
FIG. 2 is an illustration of an exemplary videoconferencing system environment.

FIG. 2 is an illustration of an exemplary videoconferencing system environment 200. Several persons 205 (205A-205C) are gathered around a table 210, which has thereupon a plurality of microphones 115 (115A-115E). There is a display 215, which may be a TV, showing a remote person 220. Also shown is a speaker 225. There is a transmitter system 105 which is connected to the cameras and microphones, and a receiver system 160 which is connected to the display and speaker. As mentioned, the transmitter system 105 and receiver system 160 may be, and typically are, embodied in a single device and are connected by a convenient transmission media to one or more remote videoconferencing systems.

When a local person speaks, such as person 205B, the control system 120 detects the signal from microphone 115B, switches to microphone 115B, switches to a camera 110B previously pointed toward the area of the person 115B, or points a camera 110B toward the area of the person 115B, and then transmits the audio signal from the microphone 115B and the video signal from the camera 115B to the remote location, possibly along with a signal indicating that person 205B should be prominently displayed on the remote screen. To point or to direct a camera, as used herein, is to pan, tilt, and/or zoom the camera to achieve a desired picture of a desired location.

Consider now the situation wherein a sound-reflective object or surface 230, such as a mirror, picture, or window is present. The remote speaker 220 is talking and the voice of the remote speaker 220 is broadcast into the room by a speaker 225. The sound 235 of the remote speaker 220 bounces off the reflective surface 230 and arrives at the microphone 115D. The control system 120 detects the reflected voice 235 at microphone 115D and erroneously determines that there is a local person at microphone 115D who is speaking. The control system 120 then switches to the microphone 115D and points a camera 110 toward the empty space near microphone 115D. Thus, reflected sounds and echoes can cause problems during videoconferencing sessions. This may occur repeatedly until the remote person 220 quits speaking or someone turns down the volume of the speaker 225.

To eliminate or at least reduce such erroneous ASD action, the transmitter system 105 injects a tag(s) into the audio signal and/or video signal. The display 215 and the speaker 225 will then reproduce those tag(s) in their outputs. Now, consider again the situation wherein the remote speaker 220 is talking and the voice of the remote speaker 220 is broadcast into the room by a speaker 225. The sound 235 of the remote speaker 220 bounces off the reflective surface 230 and arrives at the microphone 115D. The control system 120 detects the reflected voice 235 at microphone 115D but also detects the tag in the reflected voice 235. The control system 120 then determines that the sound is from the remote speaker, not a local speaker, and therefore takes no action with respect to the reflected voice.

As another approach, when the reflected voice 235 is present at microphone 115D, the control system 120 may instead, or in addition, inspect the output of the camera. If the video tag is present then the control system 120 determines that the sound is reflected sound, and therefore takes no action with respect to the reflected voice.

When, however, a local person 205B speaks, the microphone 115B detects the voice of the local person 205B, but an audio tag is not present. The control system 120 then correctly switches to microphone 115B and directs a camera 110 toward the local person 205B, and a video tag will not be present. Thus, the control system 120 correctly determines that the person 205B is speaking and takes appropriate action. It will be appreciated that some reflected sound 235 may appear at microphones 115B as well. The volume of the reflected sound 235 will, however, be significantly less than the volume of the voice of the local speaker 205B, so the reflected tag will be at too low a level to be detected by the control system 120. That is, when the sound from the microphone is digitized, the tag volume will be below the level of the least significant bit(s). The reflected sound 235 may also be picked up by other microphones 115 as well, but the control system 120 will reject these microphones either because their volume is less than the volume at microphone 115B or because the tag will be readily detectable.

It is possible, in some situations, that there will be a camera 240 in the back of the room in addition to, or instead of, the cameras 110. Assume now that the remote person 220 is speaking and the sound emitted by the speaker 225 is received by a microphone 115A or 115E. A conventional system might erroneously detect that received sound as a local speaker and switch to that microphone and direct the camera 240 toward that location. Instead, with the tags used herein, the control system 120 will detect the tag in the audio signal picked up by the microphone 115A or 115E, determine that the voice is not that of a local speaker, and not switch to the microphone 115A or 115E. Also, the control system 120 may point the camera 240 toward the display 215, detect the video tag being emitted by the display 215, and then point the camera 240 back to its original direction or to a default direction. Thus, the audio and video tags enhance the videoconferencing experience by reducing or eliminating erroneous switching of the camera and/or microphone caused by the voice of the remote speaker.

The tags may also be used for identification of the videoconference, if desired. For example, the tags may contain information regarding the company name, time, date, room location, transmitting equipment used such as but not limited to model, manufacturer, serial number, software version, trademark information, copyright information, confidentiality information, ownership information, protocol or standard used, etc. All of this information need not be transmitted, nor does all of the desired information need to be transmitted at once, repeatedly, or continuously. Rather, the bits which identify the tag as such need only be transmitted frequently enough that the control system 120 can recognize the tag as such. Thus, for example, as mentioned above, the bits which identify the tag as might only be transmitted every N data words, the other data words being used for the transmission of the information mentioned above.

In addition, information contained in the tag(s) need not be obtained from the picture presented by the display 215 or from the sound presented by the speaker 225. Rather, and preferably, this information is obtained directly from the video and/or audio signals received by the receiver system 160.

The data rate can be quite slow but, preferably, the identifiable part of the tag is preferably delivered repeatedly in less than half the hysteresis of the ASD delay. The identifiable part of the tag is even more preferably delivered more frequently so as to accommodate lost data due to interference during transmission or room noise. The speed of delivery of the additional information is less time sensitive and therefore can be transmitted over a longer period of time.

Figure 3:
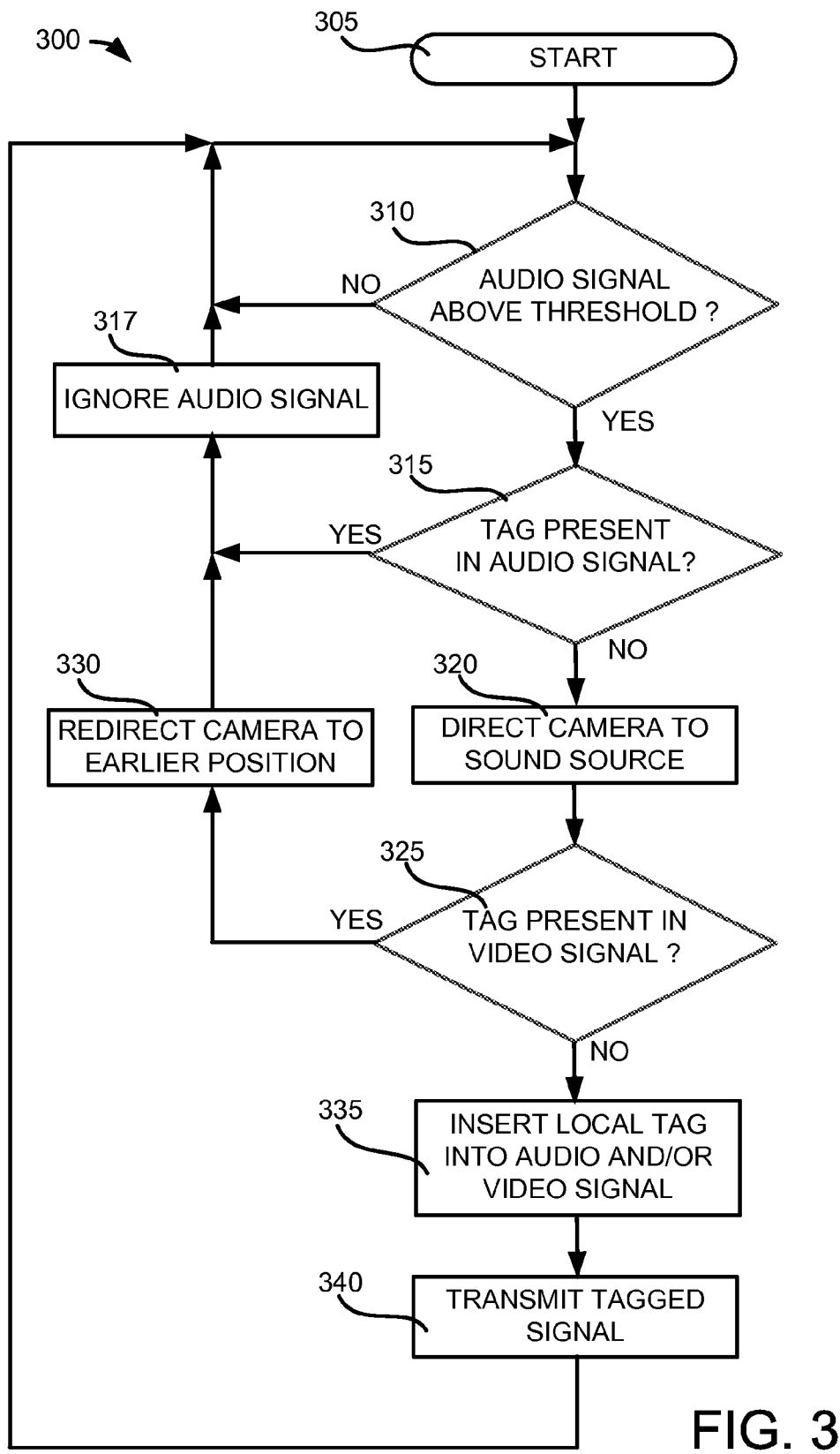
FIG. 3 is a flowchart showing an exemplary tag detection and camera and microphone control technique.

FIG. 3 is a flowchart of an exemplary tag detection and camera and microphone control technique 300. After starting 305, a determination 310 is made as to whether any audio signal is above a threshold level. If not, a return is made to 310. If so, then a determination 315 is made as to whether a tag is present in that audio signal. If so, then that audio signal is ignored 317 and a return is made to 310. If not, then a camera is directed or pointed 320 toward the sound source identified by the audio signal. For example, if the audio signal is from microphone 115A then a camera 110 will be pointed toward the area serviced by microphone 115A, or a camera which has been previously pointed toward that area will be selected.

A determination is then made 325 as to whether a tag is present in the video signal from that camera. If so, then the camera is redirected 330 to its earlier position or the previous camera is selected. If not, then local tag(s) are inserted 335 into the audio signal and/or the video signal. The tagged signal(s) are then transmitted. A return is then made to 310.

Thus, if a microphone is picking up sound and there is an audio tag embedded in that sound, or if a camera is directed toward the source of that sound is picking up a video tag embedded in the video signal, then the system will ignore that sound and leave the microphone and camera settings as they were. If, however, an embedded tag is not detected in either signal, then the microphone and/or camera will be selected for transmission of that sound and picture to the remote videoconferencing after insertion of a local tag into at least one of those signals. Thus, an active speaker is correctly selected while remote, reflected sounds are ignored.

Figure 4:
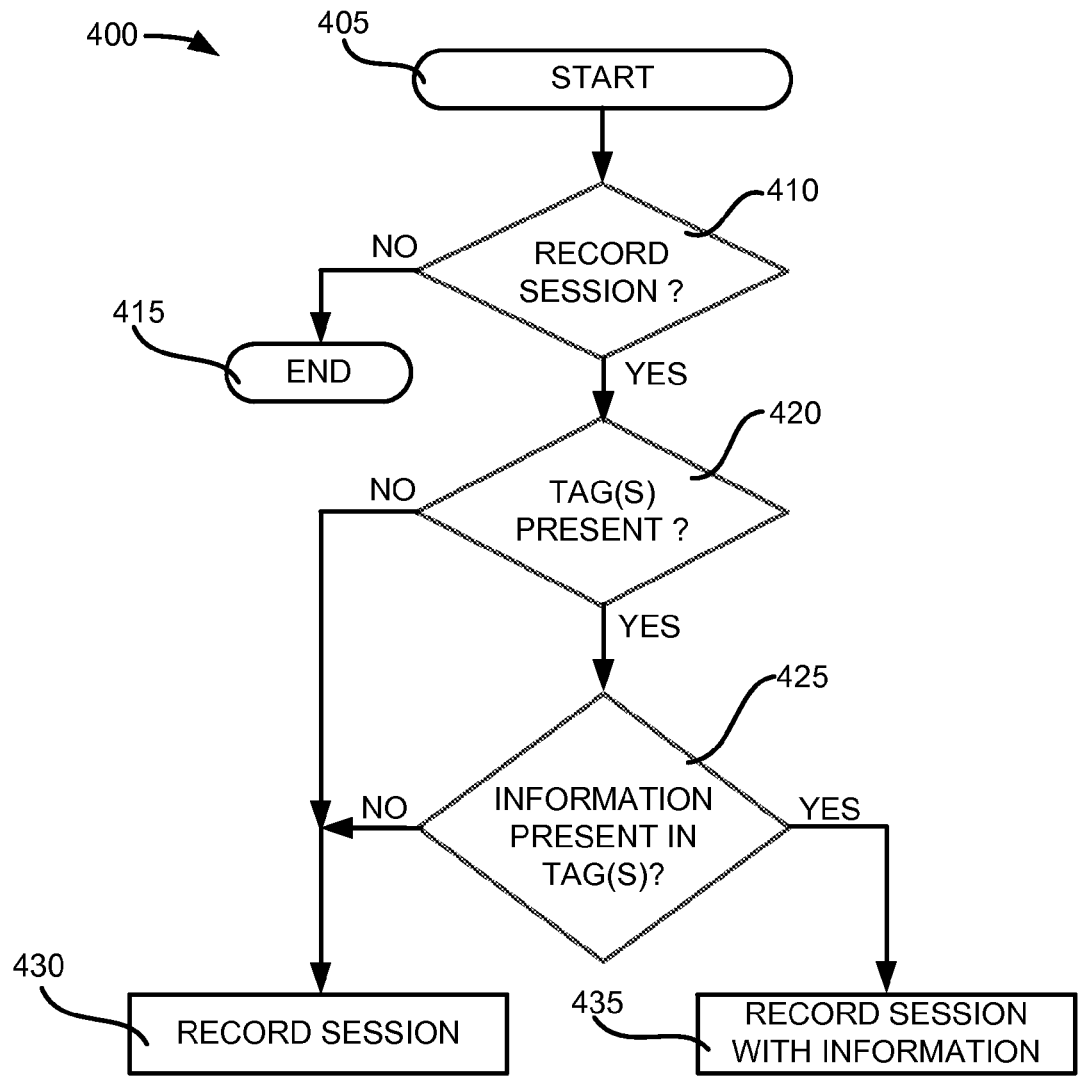
FIG. 4 is a flowchart of an exemplary information recording technique.

FIG. 4 is a flowchart of an exemplary information recording technique 400. After starting 405, a determination is made 410 whether the session is to be recorded. If not then the procedure is ended 415. If so, then a determination is made 420 as to whether tags are present. If no tag is present then the session is recorded 430. If at least one tag is present then a determination is made 425 whether information is present in the tag(s). If not then the session is recorded 430. If so, then the session is recorded 435 with at least some of the information. The information to be recorded with the session may be all of the information included in the tag or may be only a preselected portion, such as the date and time.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

Figure 5:
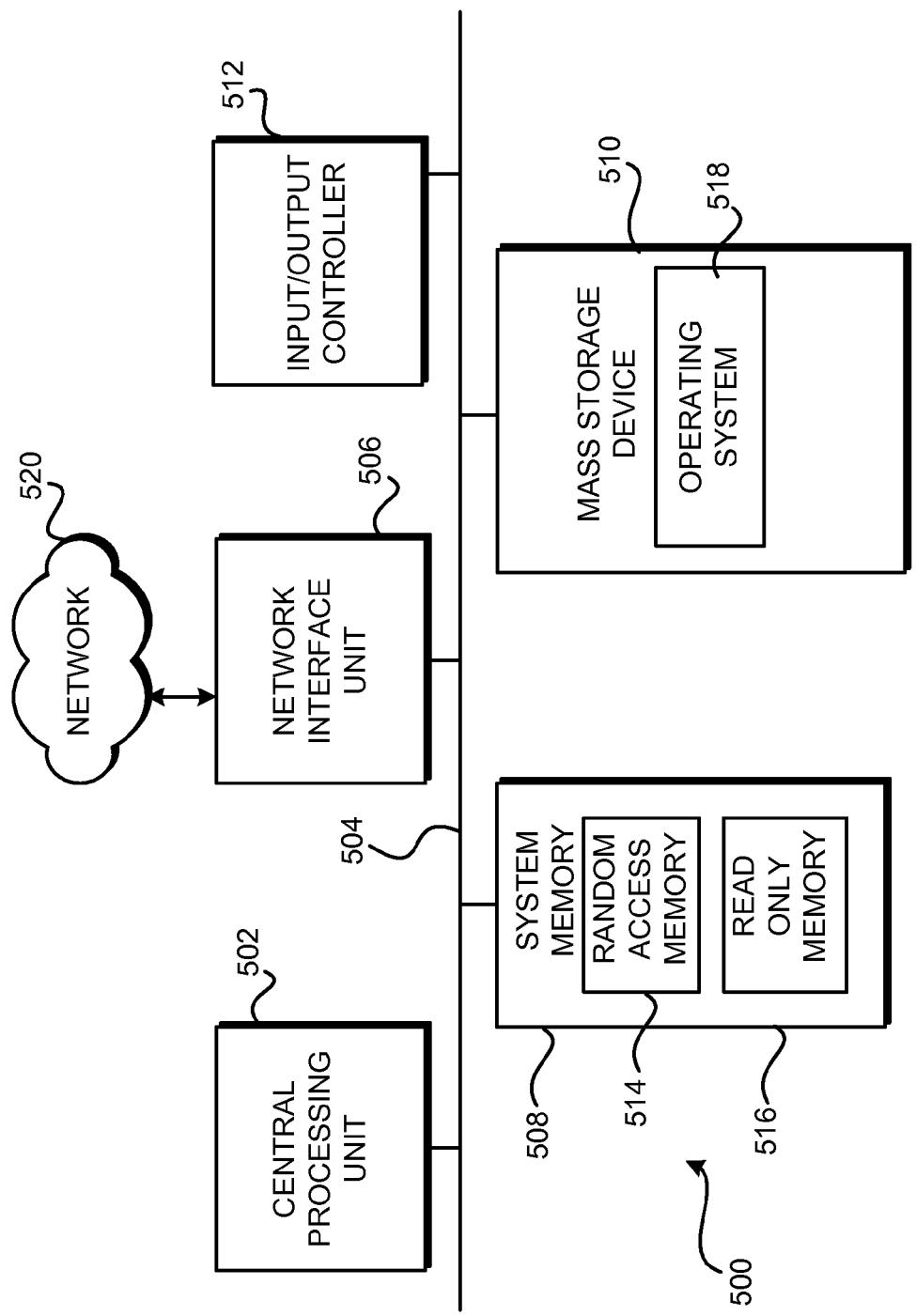

FIG. 5 shows illustrative computer architecture for a computer 500 capable of executing the software components described herein for a videoconferencing system in the manner presented above. The computer architecture shown illustrates a conventional desktop, laptop, or server computer and may be utilized to execute any aspects of the software components presented herein described as executing on the client computer 104, the front-end server computers 106A-106N, or the back-end server computers 108A-108N. The computer architecture shown includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which are described in greater detail herein.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500. For purposes of the claims, the phrase "computer storage medium," and variations thereof, does not include waves or signals per se and/or communication media.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

According to various embodiments, the computer 500 may operate in a networked environment using logical connections to remote computers through a network such as the network 520. The computer 500 may connect to the network 520 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus. Similarly, an input/output controller may provide output to a display screen, a printer, or other type of output device.

As mentioned briefly above, a number of program modules and data files may be stored in the mass storage device 510 and RAM 514 of the computer 500, including an operating system 518 suitable for controlling the operation of a networked desktop, laptop, or server computer. The mass storage device 510 and RAM 514 may also store one or more program modules which implement the various operations described above. The mass storage device 510 and the RAM 514 may also store other types of program modules.

While the subject matter described herein is presented in the general context of one or more program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced, if desired, with other computer system configurations, including hand-held devices, multiprocessor systems, microprocessor-based or programmable consumer electronics, minicomputers, mainframe computers, and the like.

Based on the foregoing, it should be appreciated that technologies for videoconferencing are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A transmitter system for a videoconferencing system, comprising:
    a tag generator to generate an audio tag;
    a combiner to combine an audio signal with the audio tag to produce a tagged audio signal; and
    a transmitter to transmit the tagged audio signal and a corresponding video signal; and
    a control system operative to:
        determine whether the audio signal is above a threshold level;

if the audio signal has been determined to be above the threshold level, then determine whether the audio signal has an audio tag embedded therein; and if the audio signal has been determined not to have an audio tag embedded therein, then either direct a camera toward a source of the audio signal or select a camera pointing toward a source of the audio signal, wherein the camera produces the corresponding video signal.

2. The transmitter system of claim 1 and further comprising a control system to receive a plurality of audio signals, and to select one of the received audio signals as the audio signal to be combined with the audio tag, wherein the control system selects one of the received audio signals which does not contain an audio tag from another videoconferencing system.

3. The transmitter system of claim 1 wherein distortion of the audio signal caused by the audio tag is below a predetermined level.

4. The transmitter system of claim 1 wherein the control system is further operative to:
   determine whether the corresponding video signal has a video tag embedded therein; and
   if the video signal has been determined to have a video tag embedded therein, then either redirect the camera to a previous source of an audio signal or select a previously-selected camera.

5. The transmitter system of claim 4 wherein the control system is further operative to:
   if the corresponding video signal has been determined not to have a video tag embedded therein, then instruct the combiner to combine the audio signal with the audio tag to produce the tagged audio signal and instruct the transmitter to transmit the tagged audio signal and the corresponding video signal.

6. The transmitter system of claim 1 and further comprising:
   a video tag generator;
   a video combiner to combine the corresponding video signal with the video tag to produce a tagged video signal; and
   wherein the transmitter also transmits the tagged video signal.

7. A method for operating a videoconferencing system, the method comprising:
   receiving an audio signal;
   receiving a corresponding video signal;
   generating an audio tag;
   determining whether the audio signal is above a threshold level;
   if the audio signal has been determined to be above the threshold level, then determining whether the audio signal has an audio tag embedded therein; and
   if the audio signal has been determined not to have an audio lag embedded therein, then
      either directing a camera toward a source of the audio signal or selecting a camera pointing toward a source of the audio signal, wherein the camera produces the corresponding video signal;
   combining the audio signal with the audio tag to produce a tagged audio signal; and
   transmitting the tagged audio signal and the corresponding video signal.

8. The method of claim 7 wherein there are a plurality of received audio signals, and further comprising selecting an audio signal for combining which does not contain an audio tag from another videoconferencing system.

9. The method of claim 7 wherein distortion of the audio signal caused by the audio tag is below a predetermined level.

10. The method of claim 7 and further comprising, prior to combining the audio signal with the audio tag:
   determining whether the corresponding video signal has a video tag embedded therein; and
   if the video signal has been determined to have a video tag embedded therein, then either redirecting the camera to a previous source of an audio signal or selecting a previously-selected camera.

11. The method of claim 10 and further comprising, prior to combining the audio signal with the audio tag:
   if the corresponding video signal has been determined not to have a video tag embedded therein, then performing the combining and transmitting.

12. The method of claim 11 and further comprising:
   prior to the transmitting, generating a video tag, and combining the corresponding video signal with the video tag to produce a tagged video signal; and
   wherein transmitting the corresponding video signal comprises transmitting the tagged video signal.

13. A computer storage medium having computer executable instructions stored thereon which, when executed by a computer, cause the computer to:
   determine whether a received audio signal is above a threshold level;
   if the received audio signal has been determined to be above the threshold level, the determine whether the received audio signal has an audio tag embedded therein;
   if the received audio signal has been determined not to have an audio lag embedded therein, then
      either direct a camera toward a source of the received audio signal or select a camera pointing toward a source of the received audio signal, wherein the camera produces a corresponding video signal;
   generate an audio tag;
   combine the received audio signal with the audio tag to produce a tagged audio signal; and
   transmit the tagged audio signal and the corresponding video signal.

14. The computer storage medium of claim 13 wherein the computer storage medium further comprises computer executable instructions stored thereon which, when executed by a computer, cause the computer to detect audio tags from a remote videoconferencing system in a plurality of received audio signals, and to select, as the audio signal to be combined with the audio tag, one of the received audio signals which does not contain an audio tag from another videoconferencing system.

15. The computer storage medium of claim 13 wherein the computer storage medium further comprises computer executable instructions stored thereon which, when executed by a computer, further cause the computer, prior to combining the audio signal with the audio tag, to:
   determine whether the corresponding video signal has a video tag embedded therein; and
   if the corresponding video signal has been determined to have a video tag embedded therein, then either redirect the camera to a previous source of an audio signal or select a previously-selected camera.

16. The computer storage medium of claim 15 wherein the computer storage medium further comprises computer executable instructions stored thereon which, when executed by a computer, further cause the computer, prior to combining the audio signal with the audio tag, to:

if the corresponding video signal has been determined not to have a video tag embedded therein, then performing the combining and transmitting.

17. The computer storage medium of claim 13 wherein the computer storage medium further comprises computer executable instructions stored thereon which, when executed by a computer, further cause the computer to:
prior to the transmitting, generate a video tag, and combine the corresponding video signal with the video tag to produce a tagged video signal; and
wherein to transmit the corresponding video signal comprises to transmit the tagged video signal.

\* \* \* \* \*